(12) United States Patent
Matsui et al.

(10) Patent No.: US 8,882,207 B2
(45) Date of Patent: Nov. 11, 2014

(54) COMPOSITE BICYCLE WHEEL

(75) Inventors: Hisashi Matsui, Osaka (JP); Yoshitada Tanaka, Osaka (JP)

(73) Assignee: Shimano Inc., Osaka (JP)

( * ) Notice: Subject to any disclaimer, the term of this patent is extended or adjusted under 35 U.S.C. 154(b) by 75 days.

(21) Appl. No.: 13/226,139

(22) Filed: Sep. 6, 2011

(65) Prior Publication Data

US 2013/0057050 A1 Mar. 7, 2013

(51) Int. Cl.
*B60B 5/02* (2006.01)
*B60B 21/04* (2006.01)
*B60B 21/06* (2006.01)
*B60B 21/02* (2006.01)

(52) U.S. Cl.
CPC .............. *B60B 5/02* (2013.01); *B60B 21/062* (2013.01); *B60B 21/04* (2013.01); *B60B 21/025* (2013.01); *B60B 2900/212* (2013.01)
USPC ................................. 301/95.103; 301/95.104

(58) Field of Classification Search
USPC ............. 301/95.101, 95.102, 95.103, 95.104, 301/95.107
See application file for complete search history.

(56) References Cited

U.S. PATENT DOCUMENTS

| | | | | |
|---|---|---|---|---|
| 4,294,490 A | * | 10/1981 | Woelfel | 301/64.703 |
| 4,995,675 A | * | 2/1991 | Tsai | 301/64.705 |
| 5,104,199 A | | 4/1992 | Schlanger | |
| 5,975,645 A | * | 11/1999 | Sargent | 301/95.11 |
| 6,086,161 A | | 7/2000 | Luttgeharm et al. | |
| 7,918,514 B2 | * | 4/2011 | Dal Pra' | 301/95.103 |
| 7,934,778 B2 | * | 5/2011 | Denk et al. | 301/95.103 |
| 2003/0107260 A1 | * | 6/2003 | Ording et al. | 301/95.102 |
| 2005/0062337 A1 | * | 3/2005 | Meggiolan et al. | 301/95.102 |
| 2008/0191543 A1 | | 8/2008 | Sailet et al. | |
| 2010/0301663 A1 | | 12/2010 | Kismarton et al. | |

FOREIGN PATENT DOCUMENTS

| | | |
|---|---|---|
| CN | 1370693 A | 9/2002 |
| CN | 2763099 Y | 3/2006 |
| CN | 101028784 A | 9/2007 |
| DE | 20 2007 018 487 U1 | 10/2008 |
| DE | 10 2008 022 781 A1 | 11/2009 |
| EP | 1 506 882 A1 | 2/2005 |
| WO | 2010/118860 A2 | 10/2010 |

OTHER PUBLICATIONS

Shimano Inc.; Wheels RC-50 High Profile Carbon Wheel; Shimano Inc. Osaka, Japan.
European Search Report of corresponding EP Application No. 12 17 9810.2 dated Aug. 5, 2013.

\* cited by examiner

*Primary Examiner* — Kip T Kotter
*Assistant Examiner* — Jean Charleston
(74) *Attorney, Agent, or Firm* — Global IP Counselors, LLP

(57) ABSTRACT

A composite bicycle wheel is provided with a first circumferential side wall, a second circumferential side wall and an outer bridge. The first circumferential side wall has a radial inner end and a radial outer end. The second circumferential side wall has a radial inner end and a radial outer end. The outer bridge connects the radial outer ends of the first and second circumferential side walls. At least one of the outer bridge and the first and second circumferential side walls includes a vibration suppression layer.

18 Claims, 10 Drawing Sheets

COMPOSITE BICYCLE WHEEL

BACKGROUND

1. Field of the Invention

This invention generally relates to a bicycle wheel. More specifically, the present invention relates to a bicycle wheel having a composite rim that suppresses vibrations.

2. Background Information

There are many different types of bicycle wheels, which are currently available on the market. Most bicycle wheels have a hub portion, a plurality of spokes and an annular rim. The hub portion is attached to a part of the frame of the bicycle for relative rotation. The inner ends of the spokes are coupled to the hub and extend outwardly from the hub. The annular rim is coupled to the outer ends of the spokes and has an outer portion for supporting a pneumatic tire thereon. Typically, the spokes of the bicycle wheel are thin metal wire spokes.

In the past, most conventional bicycle rims were constructed of various metal materials. However, in more recent years, the bicycle rims have been constructed using composite materials to make them more lightweight. For example, in U.S. Pat. No. 7,464,994, a bicycle rim has been proposed that has a continuously extending resin material covering a portion of an annular metallic rim member. In U.S. Pat. No. 5,104,199, a bicycle rim has been proposed that has a molded body attached to a rim hoop. Also bicycle rims have been proposed that are mainly formed of woven carbon fibers that are impregnated with a thermosetting resin. One example of a bicycle rim that is made primarily of woven carbon fibers is disclosed in U.S. Pat. No. 7,614,706.

SUMMARY

One aspect is to provide a composite bicycle rim that that suppresses vibrations.

In view of the state of the known technology, a composite bicycle wheel is provided that comprises a first circumferential side wall, a second circumferential side wall and an outer bridge. The first circumferential side wall has a radial inner end and a radial outer end. The second circumferential side wall has a radial inner end and a radial outer end. The outer bridge connects the radial outer ends of the first and second circumferential side walls. At least one of the outer bridge and the first and second circumferential side walls includes a vibration suppression layer.

These and other objects, features, aspects and advantages of the disclosed composite bicycle wheel will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
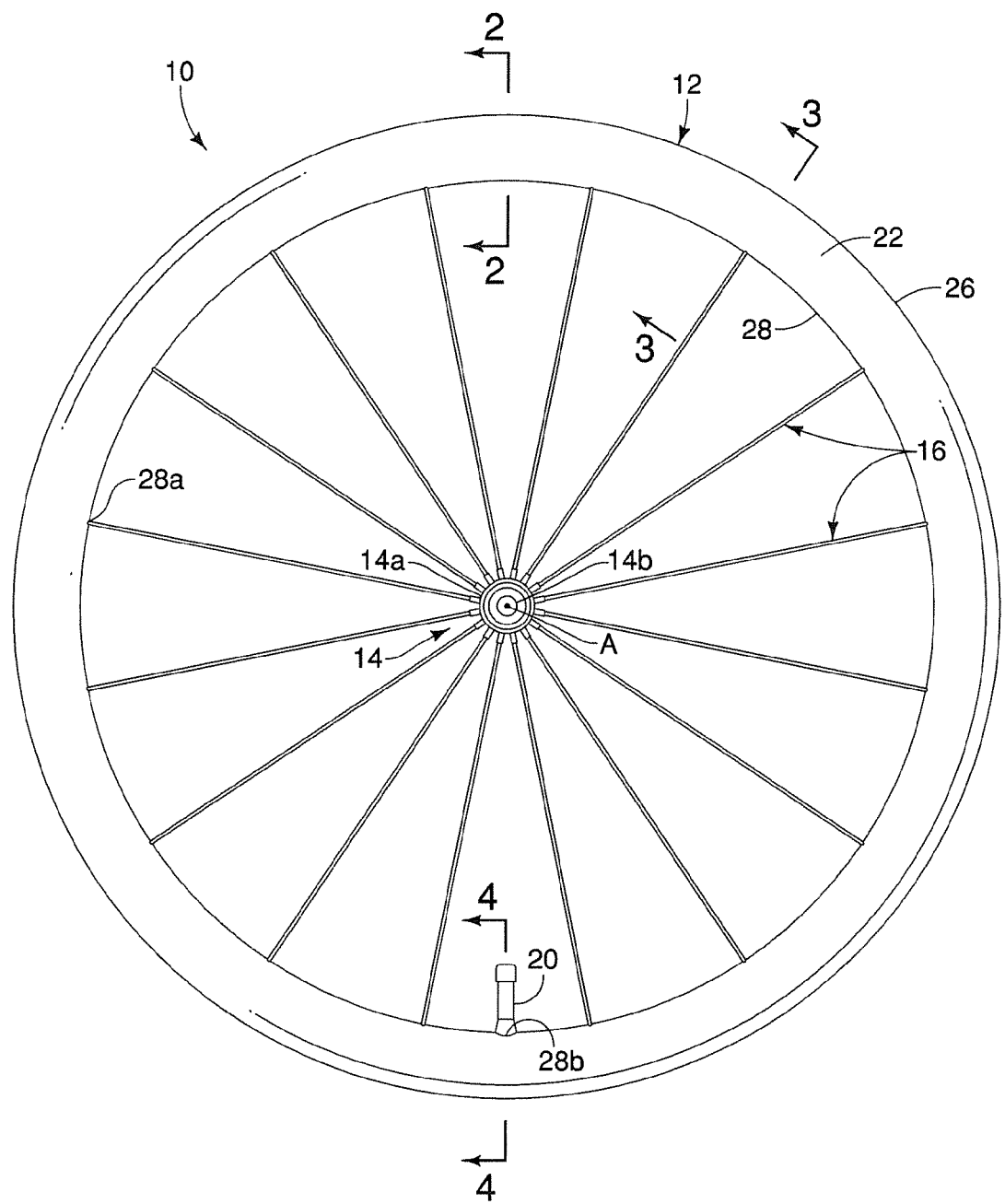
FIG. 1 is a side elevational view of a composite bicycle wheel that is equipped with a bicycle rim made of a composite material in accordance with a first illustrated embodiment.

Referring initially to FIG. 1, a composite bicycle wheel 10 is illustrated in accordance with a first embodiment. The bicycle wheel 10 basically includes a bicycle rim 12, a center hub 14 and a plurality of spokes 16. The bicycle wheel 10 basically includes a bicycle rim 12, a center hub 14 and a plurality of spokes 16. As seen in FIG. 1, the rim 12 is an annular member that is designed for rotation about a center rotational axis A formed by the axle of the hub 14. The spokes 16 interconnect the rim 12 and the center hub 14 together in a conventional manner. A pneumatic tire (not shown) is secured to the outer surface of the rim 12 in a conventional manner.

First, the center hub 14 will be briefly described. The center hub 14 includes a hub shell 14a that is rotatably mounted on a hub axle 14b via a pair of bearing units (not shown). The center hub 14 can be any type of bicycle hub that can be used with the bicycle rim 12. In other words, the precise construction of the center hub 14 is not important to the construction of the composite bicycle wheel 10. Thus, the center hub 14 will not be discussed and/or illustrated in further detail herein. Also, while a front hub is illustrated, the bicycle rim 12 can also be used with a rear hub to form a rear wheel as needed and/or desired.

Likewise, the precise construction of the spokes 16 is not important to the construction of the composite bicycle wheel 10. The spokes 16 can be any type of spokes or other type of connecting device (e.g., a metal spoke, a composite spoke, a disc-shaped connecting member, etc.). Thus, the spokes 16 will not be discussed and/or illustrated in detail herein. In the first illustrated embodiment, the spokes 16 are metal, radial tension spokes. The spokes 16 connect the hub 14 to the rim 12, with one or both ends of each of the spokes 16 being provided with a spoke nipple. In the first illustrated embodiment, for example, sixteen radial spokes 16 are coupled to the rim 12 at equally spaced circumferential locations as seen in FIG. 1. In the first illustrated embodiment, eight of the spokes 16 extend from the center of the rim 12 to one side of the hub 14, while the other eight spokes 16 extend from the center of the rim 12 to the other side of the hub 14. Of course, it will be apparent to those skilled in the art from this disclosure that the rim 12 could use be modified to accommodate different spoking arrangements (e.g. all tangential spokes, some tangential spokes and some radial spokes, etc.) without departing from the scope of the present invention. Also, it will also be apparent to those skilled in the art from this disclosure that the rim 12 could use be modified to accommodate fewer or more than sixteen spokes if needed and/or desired. In any case, the spokes 16 are preferably coupled to the rim 12 in a circumferentially spaced arrangement.

Figure 2:
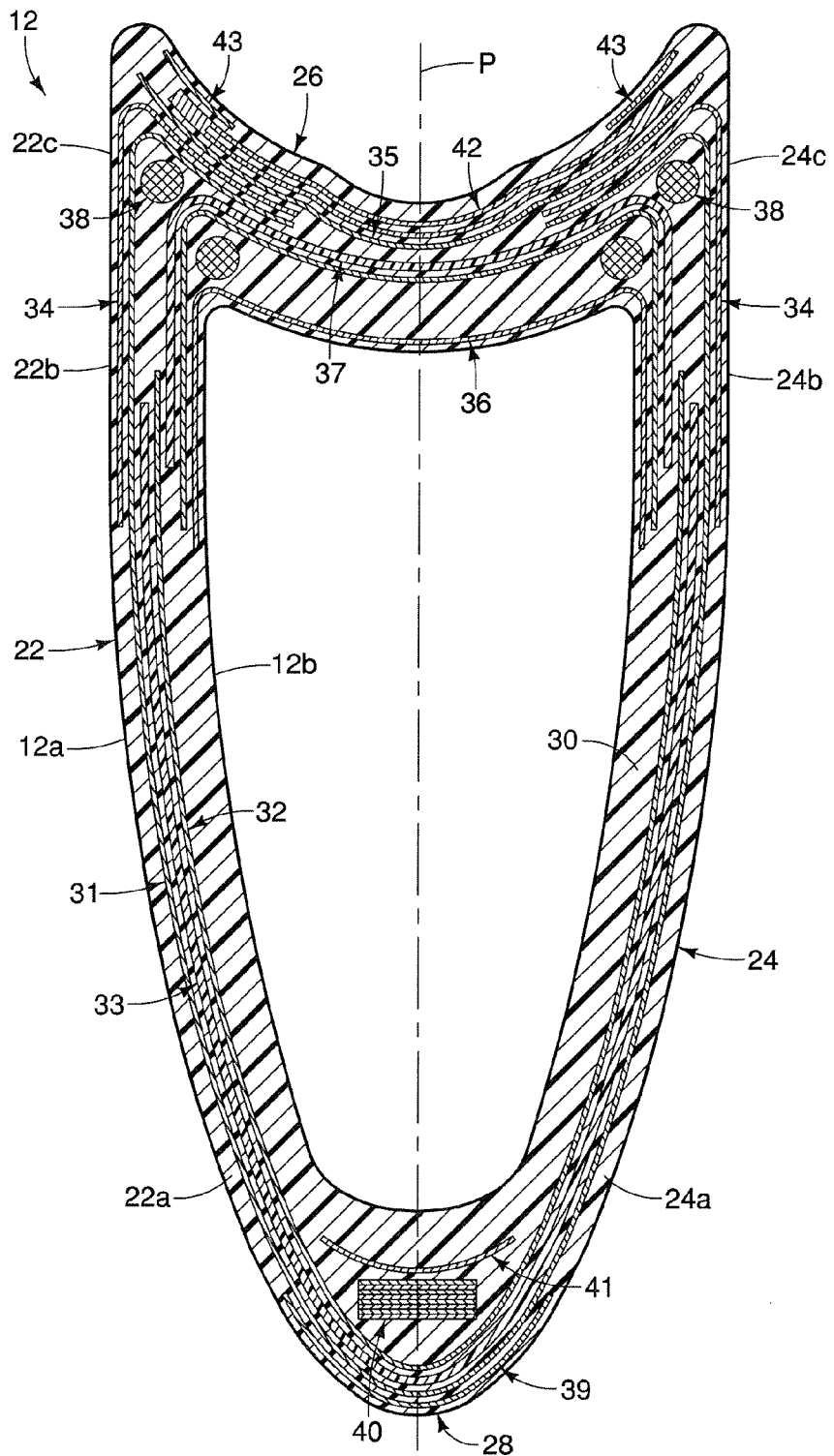
FIG. 2 is an enlarged, partial cross-sectional view of the bicycle rim illustrated in FIG. 1 as seen along section line 2-2 in FIG. 1.
Figure 3:
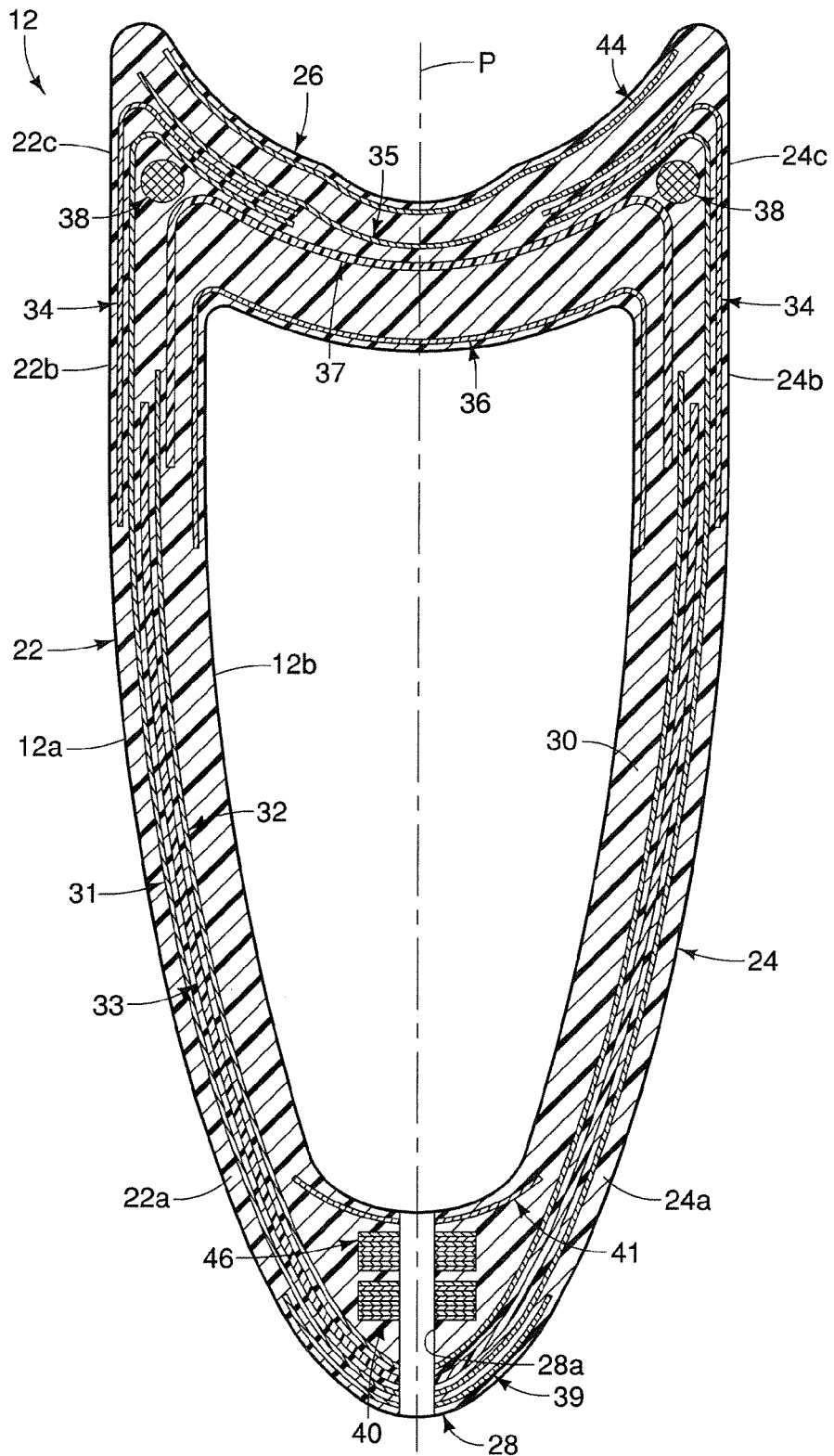
FIG. 3 is an enlarged, partial cross-sectional view of the bicycle rim illustrated in FIG. 1 as seen along section line 3-3 in FIG. 1.
Figure 4:
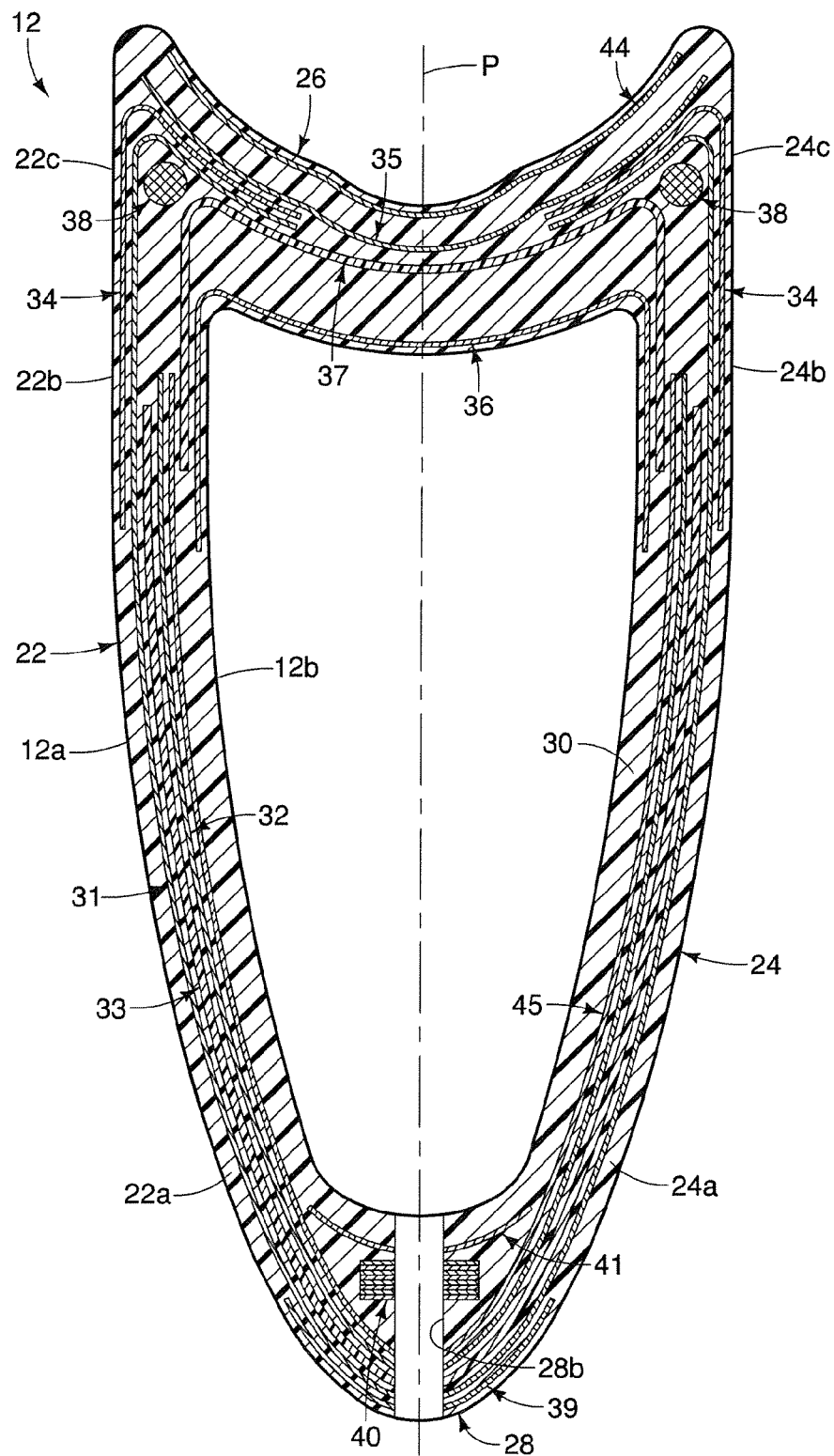
FIG. 4 is an enlarged, partial cross-sectional view of the bicycle rim illustrated in FIG. 1 as seen along section line 4-4 in FIG. 1.

Turning now to FIGS. 2 to 4, the construction of the rim 12 will now be discussed in more detail. Basically, in the first illustrated embodiment, the rim 12 is a completely non-metallic composite member. However, a metal tire attachment structure could be used with the rim 12 if desired. The rim 12 is provided with a air valve stem 20 that is mounted to the rim 12 in a conventional manner. The rim 12 basically includes a first circumferential side wall 22, a second circumferential side wall 24 and an annular outer bridge 26. Also in the first illustrated embodiment, the first and second circumferential side walls 22 and 24 and the annular outer bridge 26 form an annular interior space or area, which can be empty or filled with a foam material or the like. In the first illustrated embodiment, the rim 12 is symmetrical in construction and configuration with respect to the center plane P.

The first circumferential side wall 22 has a radial inner end 22a and a radial outer end 22b. The second circumferential side wall 24 has a radial inner end 24a and a radial outer end 24b. The first circumferential side wall 22 includes a first brake contact area 22c that is located adjacent the radial outer end 22b. The second circumferential side wall 24 includes a second brake contact area 24c that is located adjacent the radial outer end 24b. The first and second brake contact areas 22c and 24c are formed by oppositely facing exterior surfaces that are contacted by brake pads during a braking operation. The rim 12 has a center plane P that bisects the rim 12 into two halves. The center plane P is perpendicular to the center rotational axis A that coincides with the axle of the hub 14.

The first and second circumferential side walls 22 and 24 are connected at their radial inner ends 22a and 24a to form an inner connection 28 of the rim 12. The inner connection 28 has a plurality of spoke attachment openings 28a for receiving the outer ends of the spokes 16. However, the inner connection 28 is not limited to using metal spokes, as illustrated. Rather, the inner connection 28 of the rim 12 can be configured for use with other types of spokes as needed and/or desired. For example, the inner connection 28 of the rim 12 can be constructed to be integrated with composite spokes or a disc-shaped connecting member. The inner connection 28 also has a tire fill valve opening 28b (FIG. 1).

The radial outer ends 22b and 24b of the first and second circumferential side walls 22 and 24 are connected together by the outer bridge 26. The outer bridge 26 extends between the first and second circumferential side walls 22 and 24. The outer bridge 26 can be provided with a plurality of spoke access openings for accessing the spokes 16, if needed. The outer bridge 26 also has a tire fill valve opening (not shown). The outer bridge 26 has an annular outer surface that is concaved and transversely curved with respect to the center plane P of the rim 12 to form an annular tire engagement structure for attaching the tire thereon. Thus, the outer bridge 26 is configured to receive a sew-up or tubular tire. Thus, in this first embodiment, the rim 12 is configured as a tubular or sew-up rim for receiving a tubular or sew-up tire. However, the construction of the rim 12 as explained below is not limited to tubular or sew-up rim. Rather, the rim 12 can be configured for use with other types of tires as needed and/or desired.

The rim 12 has an overall uniform cross sectional profile about its entire circumference that forms a circular loop around the center rotational axis A. In particular, the term "overall uniform cross sectional profile" as used herein refers to the cross sectional outline of a single section of the rim 12 as seen in FIG. 3. Thus, whether the cross section of the rim 12 includes the spoke attachment openings or not, the cross sectional outline of the rim body remains unchanged.

As seen in FIGS. 2 to 4, in the first illustrated embodiment, the first and second circumferential side walls 22 and 24 and the outer bridge 26 are basically formed by laminating a plurality of structural support layers and a plurality of vibration suppression layers together with a binder material. In the first illustrated embodiment, the layers of the rim 12 are symmetrical in configuration with respect to the center plane P. The thickness and the spacing of each of the layers of the rim 12 are exaggerated in the drawings for the purpose of illustration only.

In particular, the rim 12 basically includes a binder material 30, a first or main composite body layer 31, a second or secondary composite body layer 32, a body vibration suppression layer 33, a pair of braking layers 34, a first composite bridge layer 35, a second composite bridge layer 36, a bridge vibration suppression layer 37, a pair of corner reinforcing layers 38, an inner connection composite layer 39, an inner connection reinforcement layer 40 and a top inner connection layer 41. In the first illustrated embodiment, all of these layers 31, 32, 34, 35, 36, 38, 39, 40 and 41 are annular layers that extend completely around the rim 12. Preferably, the end portions of all of these layers 31, 32, 34, 35, 36, 38, 39, 40 and 41 partially overlap at their circumferential ends. The layers 31, 32, 34, 35, 36, 38, 39, 40 and 41 are structural support layers, which give the rim strength and rigidity, while the vibration suppression layers 33 and 37 suppress and attenuate vibrations in the rim 12. The vibration suppression layers 33 and 37 are softer and less rigid relative to than the structural support layers 31, 32, 34, 35, 36, 38, 39, 40 and 41.

In additional to the structural support layers 31, 32, 34, 35, 36, 38, 39, 40 and 41, the rim 12 also has various structural support layers for proving extra reinforcement at various points along the rim. For example, the rim 12 is provided with an inlet hole reinforcement layer 42, a pair of cap side reinforcement layers 43, a plurality of spoke access opening reinforcement layers 44, a valve reinforcement layer 45 and a plurality of spoke opening reinforcement layers 46. Since these structural support layers 42 to 46 depend on the precise construction of the rim 12, e.g., the type of spoke connections and the type of tire engagement, these structural support layers 42 to 46 will not be discussed in detail herein.

In the first illustrated embodiment, the structural support layers 31, 32 to 36 and 38 to 46 are all formed from a fiber-reinforced polymer material such as one or more prepreg fiber-reinforced polymer sheets or strands. Each of the fiber-reinforced polymer sheets includes a polymer matrix that is reinforced with a plurality of fibers. The polymer matrix of the fiber-reinforced polymer sheets forms the binder material 30, while the fibers are woven to form layers 31, 32 to 36 and 38 to 46. The polymer mix is usually, vinylester or polyester thermosetting plastic or other suitable non-metallic material. The fibers of the fiber-reinforced plastic or polymer (FRP) cloth can be, for example, formed from one or more of carbon fibers, fiberglass fibers, Aramid fibers, or any other suitable non-metallic fibers. As a result, at least a majority of the first and second circumferential side walls 22 and 24 and the outer bridge 26 are formed the fiber-reinforced polymer material.

The fibers of the structural support layers 31, 32 to 36 and 38 to 46 can be arranged as randomly oriented fibers and/or unidirectional fibers. In the illustrated embodiment, the structural support layers 31, 32 to 36 and 38 to 46 are a thin sheet of continuous reinforcement fibers that is impregnated with a thermoset resin or a thermoplastic resin, which is often called prepreg sheets. For example, in the illustrated embodiment, the structural support layers 31, 32 to 36 and 38 to 46 are a fiber reinforced synthetic material having an epoxy resin impregnated with carbon fibers such as polyacrylonitrile (PAN) based carbon fibers. The binder material 30 typically defines an exterior surface 12a of the rim 12 and an interior surface 12b of the rim 12. The exterior surface 12a defines the overall cross sectional profile of the rim 12.

The vibration suppression layers 33 and 37 reduce the vibration being induced in the rim 12 from the ground and attenuate the vibration within the rim 12 quickly. Thus, the vibration suppression layers 33 and 37 attenuate vibrations more quickly than the structural support layers 31, 32 to 36 and 38 to 46 as well as more more quickly than the binder material 30. The vibration suppression layers 33 and 37 are formed from a vibration-damping material such as a polyester-based resin or other suitable material. Preferably, as illustrated, the vibration suppression layers 33 and 37 are formed from sheets of polyester-based resin. In the first illustrated embodiment, each of the vibration suppression layers 33 and 37 has a thickness of one millimeter.

In the first illustrated embodiment, the body vibration suppression layer 33 extends continuously along the first circumferential side wall 22, the inner connection 28 between the first and second circumferential side walls 22 and 24 and the second circumferential side wall 24. However, the body vibration suppression layer 33 can be divided into two annular halves that are separated at the inner connection 28 between the first and second circumferential side walls 22 and 24. Thus, a first annular part of the body vibration suppression layer 33 that is disposed in the first circumferential side wall 22 can be considered to constitute a first suppression layer of the rim 12. A second annular part of the vibration suppression layer 33 that is disposed in the second circumferential side wall 24 can be considered to constitute a second suppression layer. The bridge vibration suppression layer 37 can be considered to constitute a third suppression layer of the rim 12. In other words, the vibration suppression layer of the rim 12 includes first, second and third vibration suppression layers, which can be one continuous layer or multiple parts. Of course, the designations of "first", "second" and "third" are merely used as a convenient way of differentiating the parts of the body vibration suppression layer 33 and the bridge vibration suppression layer 37 from each other. Thus, the designations of "first", "second" and "third" can be switch.

Each of the first and second circumferential side walls 22 and 24 includes the first or main composite body layer 31 and the second or secondary composite body layer 32. The secondary composite body layer 32 is disposed beneath the main composite body layer 31, while the body vibration suppression layer 33 is disposed between the main and secondary composite body layers 31 and 32. The main and secondary composite body layers 31 and 32 of the first and second circumferential side walls 22 and 24 extend continuously along the first circumferential side wall 22, the inner connection 28 between the first and second circumferential side walls 22 and 24 and the second circumferential side wall 24.

In the illustrated embodiment, the main composite body layer 31 is formed of four prepreg sheets having an overall thickness of about 0.4 millimeter (i.e., each prepreg sheet has a thickness of about 0.1 millimeter). The fibers in the prepreg sheets of the main composite body layer 31 are unidirectional fibers that are angled with respect to the next adjacent prepreg sheet (e.g., the first prepreg sheet has a fiber direction of +60 degree, the second prepreg sheet has a fiber direction of −60 degree, the third prepreg sheet has a fiber direction of +60 degree, the fourth prepreg sheet has a fiber direction of −60 degree). The secondary composite body layer 32 is formed of two prepreg sheets having an overall thickness of about 0.2 millimeter (i.e., each prepreg sheet has a thickness of about 0.1 millimeter). The fibers in the prepreg sheets of the secondary composite body layer 32 are unidirectional fibers that are angled with respect to the next prepreg sheet (e.g., the first prepreg sheet has a fiber direction of +60 degree and the second prepreg sheet has a fiber direction of −60 degree).

The first composite bridge layer 35 does not extend from the outer bridge 26 along the outer portions of each of the first and second circumferential side walls 22 and 24. The second composite bridge layer 36 is disposed beneath the first composite bridge layer 35 and extends from the outer bridge 26 along outer portions of each of the first and second circumferential side walls 22 and 24. The bridge vibration suppression layer 37 is disposed on between the first composite bridge layer 35 and the second composite bridge layer 36. The bridge vibration suppression layer 37 also extends from the outer bridge 26 along outer portions of each of the first and second circumferential side walls 22 and 24. The body and bridge vibration suppression layers 33 and 37 can have overlapping side edges as shown or can be spaced apart if desired.

In the illustrated embodiment, the first composite bridge layer 35 is formed of four prepreg sheets having an overall thickness of about 0.4 millimeter (i.e., each prepreg sheet has a thickness of about 0.1 millimeter). The fibers in the prepreg sheets of the first composite bridge layer 35 are unidirectional fibers that are angled with respect to the next adjacent prepreg sheet (e.g., the first prepreg sheet has a fiber direction of +15 degree, the second prepreg sheet has a fiber direction of −15 degree, the third prepreg sheet has a fiber direction of +45 degree, the fourth prepreg sheet has a fiber direction of −45 degree). The second composite bridge layer 36 is formed of two prepreg sheets having an overall thickness of about 0.2 millimeter (i.e., each prepreg sheet has a thickness of about 0.1 millimeter). The fibers in the prepreg sheets of the second composite bridge layer 36 are unidirectional fibers that are angled with respect to the next prepreg sheet e.g., the first prepreg sheet has a fiber direction of +60 degree, the second prepreg sheet has a fiber direction of −60 degree, the third prepreg sheet has a fiber direction of +60 degree, the fourth prepreg sheet has a fiber direction of −60 degree).

While one particular construction of the rim 12 is illustrated and described herein, it will be apparent from this disclosure that the rim 12 is not limited to the particular illustrated construction. For example, the main composite body layer 31 and the secondary composite body layer 32 are preferably continuous layers that extend continuously along the first circumferential side wall 22, the inner connection 28 and the second circumferential side wall 24, the main composite body layer 31 and the secondary composite body layer 32 can be formed in a discontinuous arrangement as needed and/or desired. Moreover, for example, while it is preferable to form the body vibration suppression layer 33 a single sheet, as illustrated, the body vibration suppression layer 33 can be constructed of a plurality of sheets as needed and/or desired. Also for example, while it is preferable to include both the body vibration suppression layer 33 and the bridge vibration suppression layer 37, the rim 12 can be constructed with only either the body vibration suppression layer 33 or the bridge vibration suppression layer 37.

Figure 5:
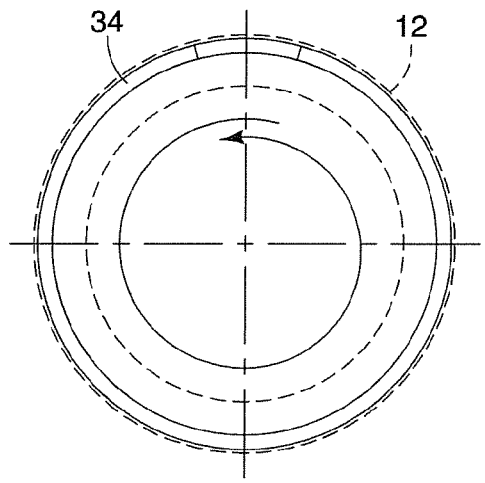
FIG. 5 is a diagrammatic representation of the braking layers for forming the braking surfaces of the bicycle rim illustrated in FIG. 1.
Figure 6:
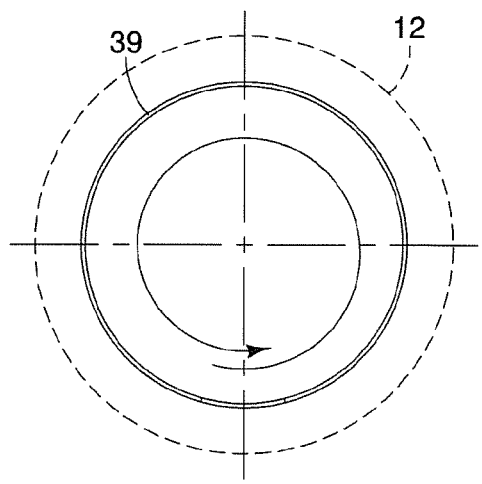
FIG. 6 is a diagrammatic representation of the bottom inner connection layer for providing structural support in the inner connection of the bicycle rim illustrated in FIG. 1.
Figure 7:
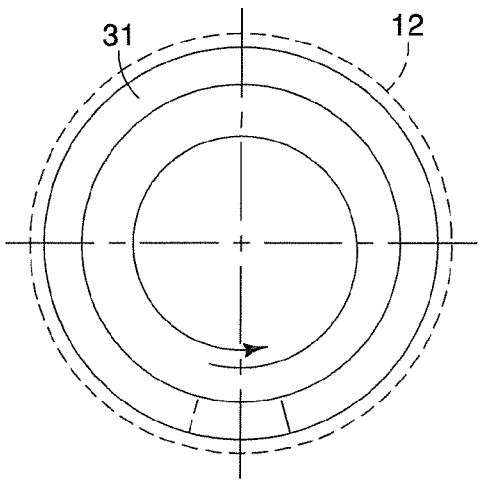
FIG. 7 is a diagrammatic representation of the first or main composite body layer for providing structural support in the first and second circumferential side walls of the bicycle rim illustrated in FIG. 1.
Figure 8:
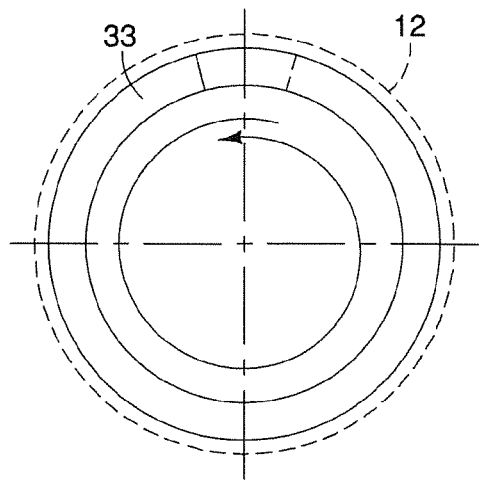
FIG. 8 is a diagrammatic representation of the body vibration suppression layer for suppressing and attenuating vibrations in the first and second circumferential side walls of the bicycle rim illustrated in FIG. 1.
Figure 9:
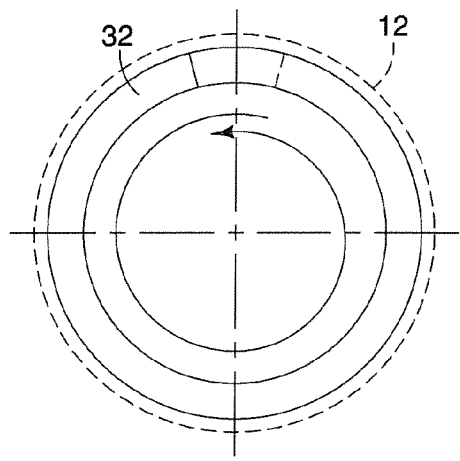
FIG. 9 is a diagrammatic representation of the second or secondary composite body layer for providing structural support in the first and second circumferential side walls of the bicycle rim illustrated in FIG. 1.
Figure 10:
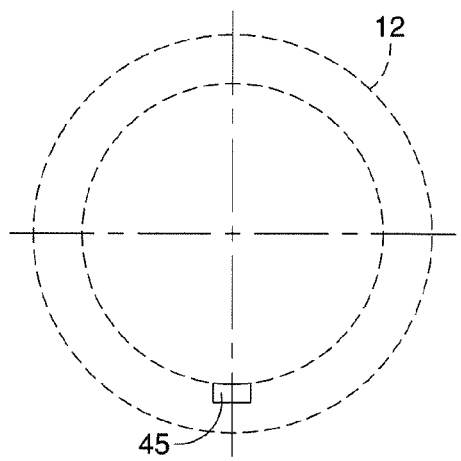
FIG. 10 is a diagrammatic representation of the valve reinforcement layer for providing structural support around the valve opening in the inner connection of the bicycle rim illustrated in FIG. 1.
Figure 11:
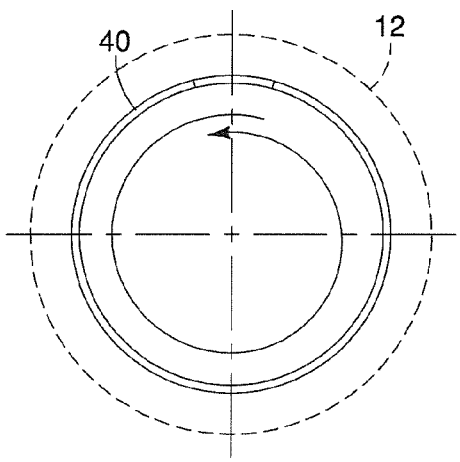
FIG. 11 is a diagrammatic representation of the inner connection reinforcement layer for providing structural support in the inner connection of the bicycle rim illustrated in FIG. 1.
Figure 12:
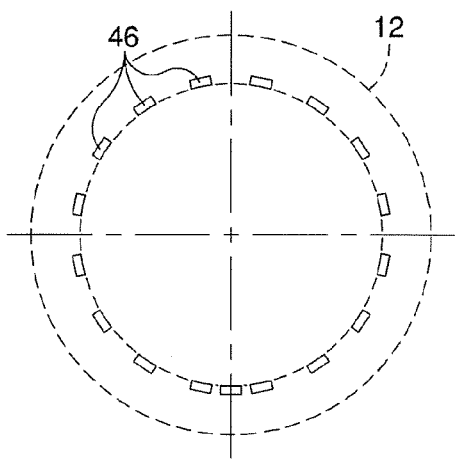
FIG. 12 is a diagrammatic representation of one of the spoke opening reinforcement layers for providing structural support around the spoke openings in the inner connection of the bicycle rim illustrated in FIG. 1.
Figure 13:
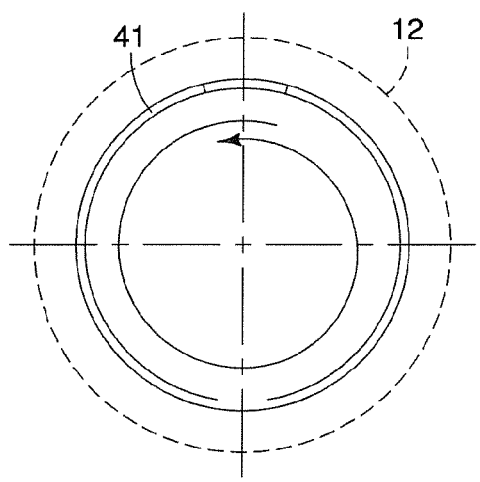
FIG. 13 is a diagrammatic representation of the top inner connection layer for providing structural support in the inner connection of the bicycle rim illustrated in FIG. 1.
Figure 14:
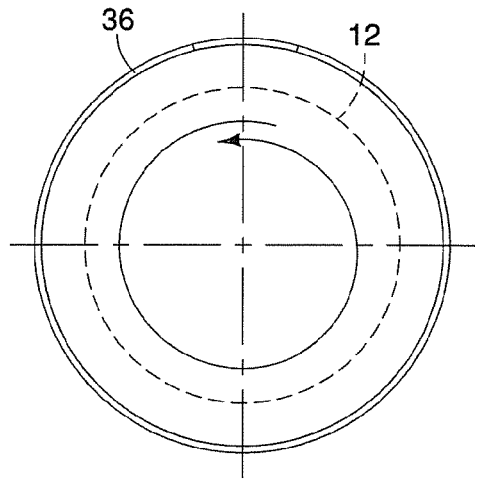
FIG. 14 is a diagrammatic representation of the second composite bridge layer for providing structural support in the outer bridge of the bicycle rim illustrated in FIG. 1.
Figure 15:
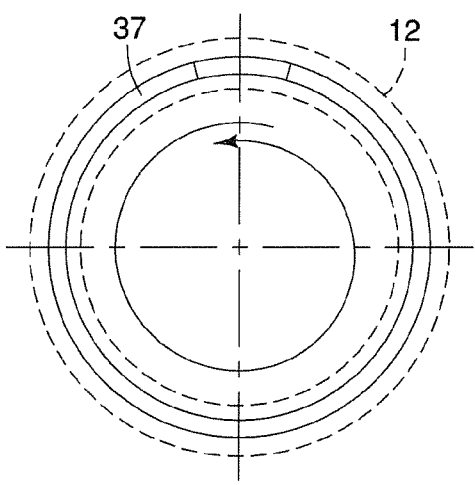
FIG. 15 is a diagrammatic representation of the bridge vibration suppression layer for suppressing and attenuating vibrations in the outer bridge of the bicycle rim illustrated in FIG. 1.
Figure 16:
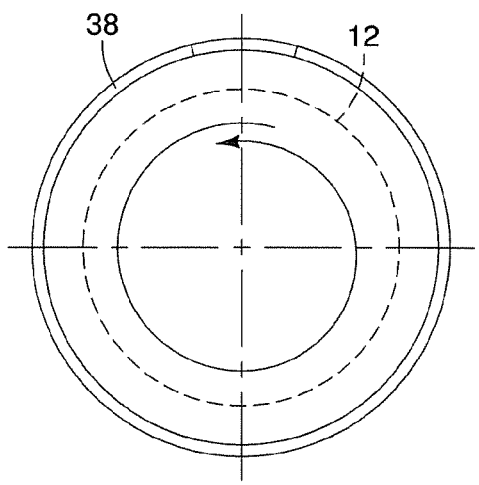
FIG. 16 is a diagrammatic representation of one of the corner reinforcing layers for providing structural support in the outer bridge of the bicycle rim illustrated in FIG. 1.
Figure 17:
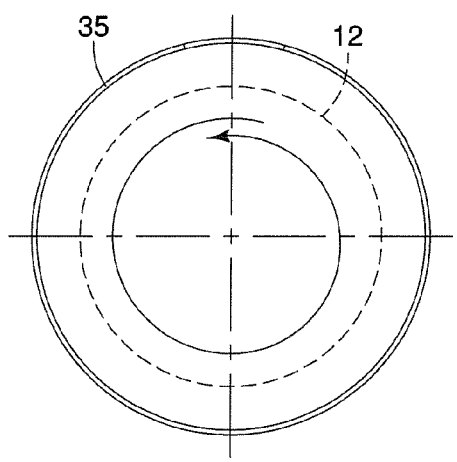
FIG. 17 is a diagrammatic representation of the first composite bridge layer for providing structural support in the outer bridge of the bicycle rim illustrated in FIG. 1.
Figure 18:
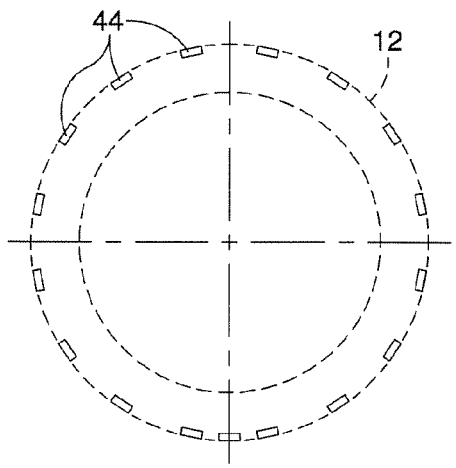
FIG. 18 is a diagrammatic representation of one of the spoke access opening reinforcement layers for providing structural support around the spoke access openings in the outer bridge of the bicycle rim illustrated in FIG. 1.
Figure 19:
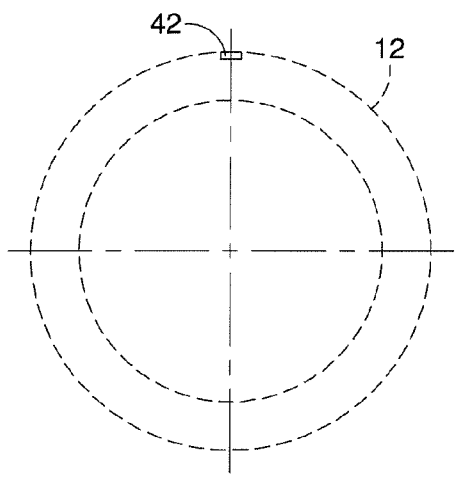
FIG. 19 is a diagrammatic representation of the inlet hole reinforcement layer for providing structural support around the inlet hole in the outer bridge of the bicycle rim illustrated in FIG. 1.
Figure 20:
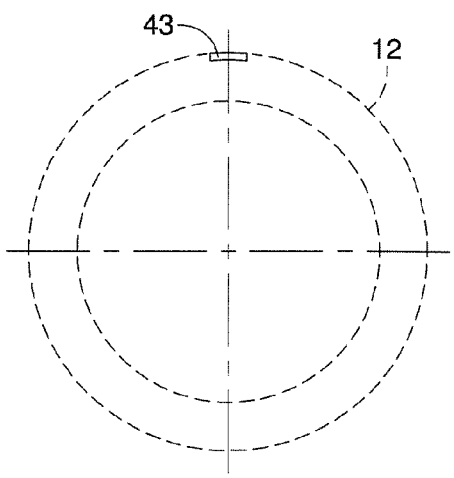
FIG. 20 is a diagrammatic representation of one of the cap side reinforcement layers for providing structural support at the corners of the outer bridge of the bicycle rim illustrated in FIG. 1.

Referring now to FIGS. 5 to 20, the layering process for manufacturing the rim 12 will now be briefly discussed. While the following layering process will be explained in a particular order of placing the prepeg sheets of the layers 31 to 38 onto a mold, die or other rim forming member, it will be apparent that the order can be changed as needed and/or desired First, as seen in FIG. 5, each of the braking layers 34 extends fully around the rim 14 for forming the braking surfaces of the bicycle rim 14. The circumferential ends of the braking layers 34 preferably overlap. Next, as seen in FIG. 6, the bottom inner connection layer 39 extends fully around the rim 14 for providing structural support in the inner connection 28 of the rim 14. The circumferential ends of the bottom inner connection layer 39 preferably overlap. Next, as seen in FIG. 7, the first or main composite body layer 31 extends fully around the rim 14 for providing structural support in the first and second circumferential side walls 22 and 24 of the rim 12. The circumferential ends of the main composite body layer 31 preferably overlap. Now, as seen in FIG. 8, the body vibration suppression layer 33 extends fully around the rim 14 for suppressing and attenuating vibrations in the first and second circumferential side walls 22 and 24 of the rim 12. The circumferential ends of the body vibration suppression layer 33 preferably overlap. Then, as seen in FIG. 9, the second or secondary composite body layer 32 extends fully around the rim 14 for providing structural support in the first and second circumferential side walls 22 and 24 of the rim 14. The circumferential ends of the secondary composite body layer 32 preferably overlap. Next, as seen in FIG. 10, the valve reinforcement layer 45 provides structural support around the valve opening in the inner connection 28 the rim 12. Next, as seen in FIG. 11, the inner connection reinforcement layer 40 extends fully around the rim 14 for providing structural support in the inner connection 28 of the rim 12. The circumferential ends of the inner connection reinforcement layer 40 preferably overlap. Next, as seen in FIG. 12, the spoke opening reinforcement layers 46 provides structural support around each of the spoke openings in the inner connection 28 of the rim 12. Next, as seen in FIG. 13, the top inner connection layer 41 extends fully around the rim 14 for providing structural support in the inner connection 28 of the rim 12. The circumferential ends of the top inner connection layer 41 preferably overlap. Next, as seen in FIG. 14, the second composite bridge layer 36 extends fully around the rim 14 for providing structural support in the outer bridge 26 of the rim 12. The circumferential ends of the second composite bridge layer 36 preferably overlap. Next, as seen in FIG. 15, the bridge vibration suppression layer 37 extends fully around the rim 14 for suppressing and attenuating vibrations in the outer bridge 26 of the rim 12. The circumferential ends of the bridge vibration suppression layer 37 preferably overlap. Next, as seen in FIG. 16, the corner reinforcing layers 38 extends fully around the rim 14 for providing structural support in the outer bridge 26 of the rim 12. The circumferential ends of the corner reinforcing layers 38 preferably overlap. Next, as seen in FIG. 17, the first composite bridge layer 35 extends fully around the rim 14 for providing structural support in the outer bridge 26 of the rim 12. The circumferential ends of the first composite bridge layer 35 preferably overlap. Next, as seen in FIG. 18, the spoke access opening reinforcement layers 44 provide structural support around each of the spoke access openings in the outer bridge 26 of the rim 12. Next, as seen in FIG. 19, the inlet hole reinforcement layer 42 provides structural support around the inlet hole in the outer bridge 26 of the rim 12. Next, as seen in FIG. 20, the cap side reinforcement layers 43 provide structural support at the corners of the outer bridge 26 of the rim 12.

Figure 21:
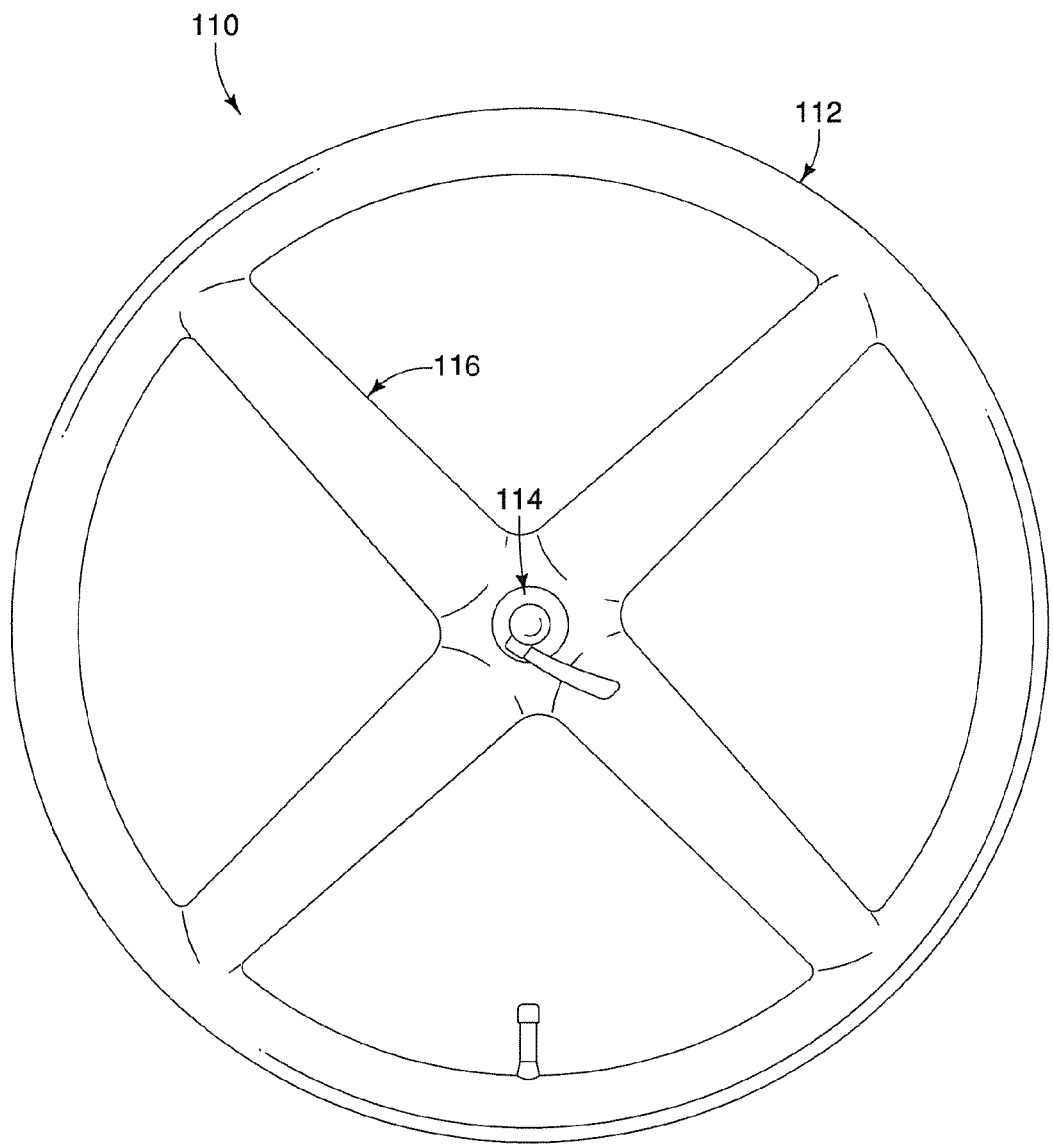
FIG. 21 is a side elevational view of a composite bicycle wheel that is equipped with a bicycle rim made of a composite material in accordance with a second illustrated embodiment.

Referring now to FIG. 21, a composite bicycle wheel 110 is illustrated in accordance with a second embodiment. The composite bicycle wheel 110 is equipped with a composite bicycle rim 112 having the same construction as shown in FIGS. 2 to 4, except a bicycle hub 114 is connected to the inner connection of the composite bicycle rim 112 by a plurality of composite spokes 116. Thus, the rim 112 will not be discussed or illustrated in detail herein. The connection between the rim 112 and the spokes 116 can be accomplished in a variety of ways, such as disclosed in U.S. Pat. No. 4,995,675. Preferably, the composite spokes 116 is formed the prepeg sheets such that the prepeg sheets of the composite spokes 116 are integrated with the prepeg sheets of the rim 112.

Figure 22:
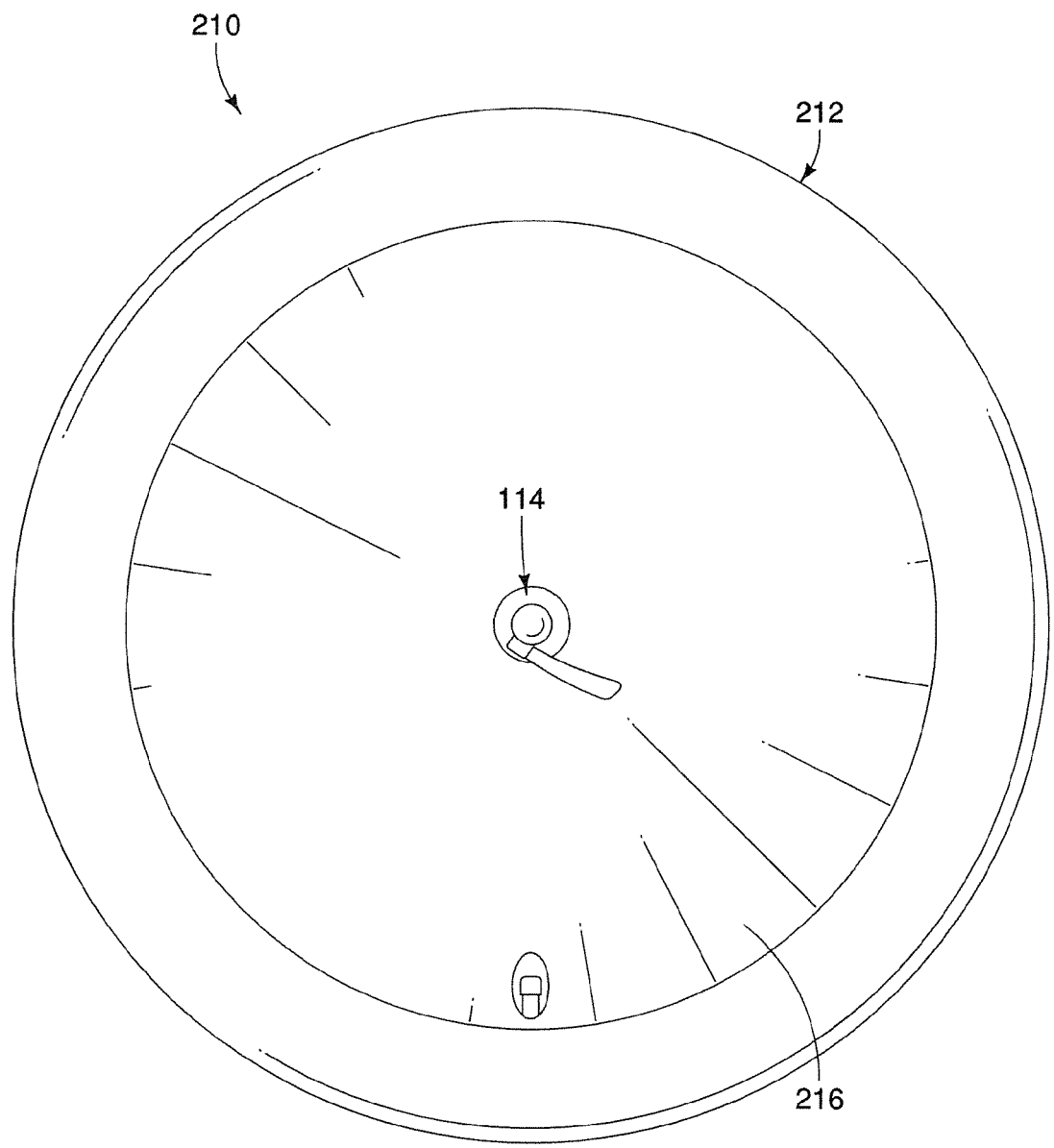
FIG. 22 is a side elevational view of a composite bicycle wheel that is equipped with a bicycle rim made of a composite material in accordance with a third illustrated embodiment.

Referring now to FIG. 22, a composite bicycle wheel 210 is illustrated in accordance with a third embodiment. The composite bicycle wheel 210 is equipped with a composite bicycle rim 212 having the same construction as shown in FIGS. 2 to 4, except a bicycle hub 214 is connected to the inner connection of the composite bicycle rim 112 by a pair of disc-shaped spokes 216. Thus, the rim 212 will not be discussed or illustrated in detail herein. The connection between the rim 212 and the the disc-shaped spokes 216 can be accomplished in a variety of ways. Preferably, the discs-shaped spokes 216 is formed the prepeg sheets such that the prepeg sheets of the disc-shaped spokes 216 are integrated with the prepeg sheets of the rim 212.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the term "layer" when used in the singular can have the dual meaning of a single layer or a plurality of layers. The words "beneath" and "above" are used herein to refer to position of a layer with respect to another layer with the rim exterior being considered to be above the layers and the rim interior being considered to be below the layers. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A composite bicycle wheel comprising:
   a first circumferential side wall having a radial inner end and a radial outer end, the first circumferential side wall including a first vibration suppression layer and a first structural support layer, the first structural support layer including a first composite body layer and a second composite body layer, the second composite body layer being disposed beneath the first composite body layer with respect to an external surface of the first circumferential side wall;
   a second circumferential side wall having a radial inner end and a radial outer end, the second circumferential side wall including a second vibration support layer and a second structural support layer, the second structural support layer including a third composite body layer and a fourth composite body layer, the fourth composite body layer being disposed beneath the third composite body layer with respect to an external surface of the second circumferential side wall; and
   an outer bridge connecting the radial outer ends of the first and second circumferential side walls,
   the first structural support layer and the first vibration suppression layer being laminated together with a binder material, the first vibration suppression layer being softer and less rigid than the first structural support layer and attenuating vibrations more quickly than the first structural support layer,
   the second structural support layer and the second vibration suppression layer being laminated together with a binder material, the second vibration suppression layer being softer and less rigid than the second structural support layer and attenuating vibrations more quickly than the second structural support layer,
   at least one of the first and second vibration suppression layers that is disposed in the first and second circumferential side walls being disposed between the first and second composite body layers or the third and fourth composite body layers of its respective one of the first and second circumferential side walls,
   the first and second vibration suppression layers being integrated as a single sheet to form a body vibration suppression layer that extends continuously along the first circumferential side wall, an inner connection between the first and second circumferential side walls, and the second circumferential side wall.

2. The composite bicycle wheel according to claim 1, further comprising
   a third vibration suppression layer and a third structural support layer that are disposed in the outer bridge, the third vibration suppression layer being softer and less rigid than the third structural support layer and attenuating vibrations more quickly than the third structural support layer.

3. The composite bicycle wheel according to claim 2, wherein
   the outer bridge comprising
      a first composite bridge layer as a part of the third structural support layer, the first composite bridge layer not extending from the outer bridge along the outer portions of each of the first and second circumferential side walls, and
      a second composite bridge layer as a part of the third structural support layer, the second composite bridge layer being disposed beneath the first composite bridge layer and extending from the outer bridge along outer portions of each of the first and second circumferential side walls, and
   the third vibration suppression layer being disposed between the first composite bridge layer and the second composite bridge layer.

4. The composite bicycle wheel according to claim 3, wherein
   the first and second composite bridge layers are formed from fiber-reinforced polymer sheets.

5. The composite bicycle wheel according to claim 4, wherein
   the fiber-reinforced polymer sheets includes a polymer matrix that is reinforced with at least one of a plurality of glass fibers, a plurality of carbon fibers and a plurality of aramid fibers.

6. The composite bicycle wheel according to claim 2, wherein
   the first, second and third vibration suppression layers are formed from a polyester-based resin.

7. The composite bicycle wheel according to claim 2, wherein the third vibration suppression layer spans fully across the outer bridge between the first and second circumferential side walls.

8. The composite bicycle wheel according to claim 2, wherein
the third vibration suppression layer extends from the outer bridge in the first and second circumferential side walls, the third vibration suppression layer overlapping the first and second vibration suppression layers in the first and second circumferential side walls.

9. The composite bicycle wheel according to claim 1, wherein
the first and third composite body layers of the first and second circumferential side walls are continuously arranged to form a main composite body layer that extends continuously along the first circumferential side wall, an inner connection between the first and second circumferential side walls, and the second circumferential side wall,
the second and fourth composite body layers of the first and second circumferential side walls are continuously arranged to form a secondary composite body layer that extends continuously along the first circumferential side wall, the inner connection between the first and second circumferential side walls, and the second circumferential side wall.

10. The composite bicycle wheel according to claim 1, wherein
the first, second, third, and fourth composite body layers are formed from fiber-reinforced polymer sheets.

11. The composite bicycle wheel according to claim 10, wherein
the fiber-reinforced polymer sheets includes a polymer matrix that is reinforced with at least one of a plurality of glass fibers, a plurality of carbon fibers and a plurality of aramid fibers.

12. The composite bicycle wheel according to claim 1, wherein
the structural support layer includes a first composite body layer and a second composite body layer disposed beneath the first composite body layer, the vibration suppression layer being disposed between the first and second composite body layers.

13. The composite bicycle wheel according to claim 12, wherein
the structural support layer is made of a fiber-reinforced polymer material, and the vibration suppression layer is made of a less rigid than the structural support layer.

14. A composite bicycle wheel comprising:
a first circumferential side wall having a radial inner end and a radial outer end;
a second circumferential side wall having a radial inner and a radial outer end;
an outer bridge connecting the radial outer ends of the first and second circumferential side walls, the outer bridge including a non-metallic structural support layer and a vibration suppression layer laminated together with a binder material, the vibration suppression layer spanning fully across the outer bridge between the first and second circumferential side walls and located interiorly of the structural support layer with respect to an exterior surface of the outer bridge
the vibration suppression layer being softer and less rigid than the structural support layer and attenuating vibrations more quickly than the structural support layer.

15. The composite bicycle wheel according to claim 14, wherein
the outer bridge comprising
a first composite bridge layer as a part of the structural support layer, the first composite bridge layer not extending from the outer bridge along the outer portions of each of the first and second circumferential side walls, and
a second composite bridge layer as a part of the structural support layer, the second composite bridge layer being disposed beneath the first composite bridge layer and extending from the outer bridge along outer portions of each of the first and second circumferential side walls, and
the vibration suppression layer being disposed between the first composite bridge layer and the second composite bridge layer.

16. A composite bicycle wheel comprising:
a first circumferential side wall having a radial inner end and a radial outer end;
a second circumferential side wall having a radial inner and a radial outer end;
an outer bridge connecting the radial outer ends of the first and second circumferential side walls, the outer bridge including a nonmetallic structural support layer and a vibration suppression layer laminated together with a binder material, the vibration suppression layer spanning fully across the outer bridge between the first and second circumferential side walls and located interiorly of the structural support layer with respect to an exterior surface of the outer bridge.

17. The composite bicycle wheel according to claim 16, wherein
the vibration suppression layer being made of a different material composition than the structural support layer and attenuating vibrations more quickly than the structural support layer.

18. The composite bicycle wheel according to claim 17, wherein
the vibration suppression layer is less rigid than the structural support layer.

* * * * *